United States Patent [19]

Farr

[11] Patent Number: 4,913,251

[45] Date of Patent: Apr. 3, 1990

[54] CONTROL DEVICE

[75] Inventor: Glyn P. R. Farr, Leek Wootton, England

[73] Assignee: Lucas Industries public limited company, Birmingham, United Kingdom

[21] Appl. No.: 267,893

[22] Filed: Nov. 7, 1988

[30] Foreign Application Priority Data

Nov. 5, 1987 [GB] United Kingdom ................ 8725934
Nov. 11, 1987 [GB] United Kingdom ................ 8726392

[51] Int. Cl.$^4$ ............................................. B60K 31/06
[52] U.S. Cl. ..................................... 180/175; 123/349
[58] Field of Search ............... 180/170, 177, 175, 176; 123/349, 378, 363

[56] References Cited

U.S. PATENT DOCUMENTS 3,502,167 3/1970 Baxter et al. ........................ 180/175
3,526,291 9/1970 Froslie ................................. 180/175
4,076,094 2/1978 Moody et al. ...................... 180/175

Primary Examiner—Charles A. Marmor
Assistant Examiner—Richard Camby
Attorney, Agent, or Firm—Scrivener and Clarke

[57] ABSTRACT

A control device for controlling the operation of a fuel control member 17 of a vehicle engine includes a piston 12 coupled to the control member and connected to the throttle pedal of the vehicle through a lost motion spring 20. The pressure in the chambers 13, 14 defined on opposite sides of the piston can be controlled by valves so that in one mode the movement of the piston and fuel control member are directly under the control of the operator and when the vehicle is driven in a second mode, the piston controls the position of the fuel control member to provide "cruise control" and in a third mode the piston can move the fuel control member in opposition to the setting determined by the driver to provide "torque control".

8 Claims, 4 Drawing Sheets

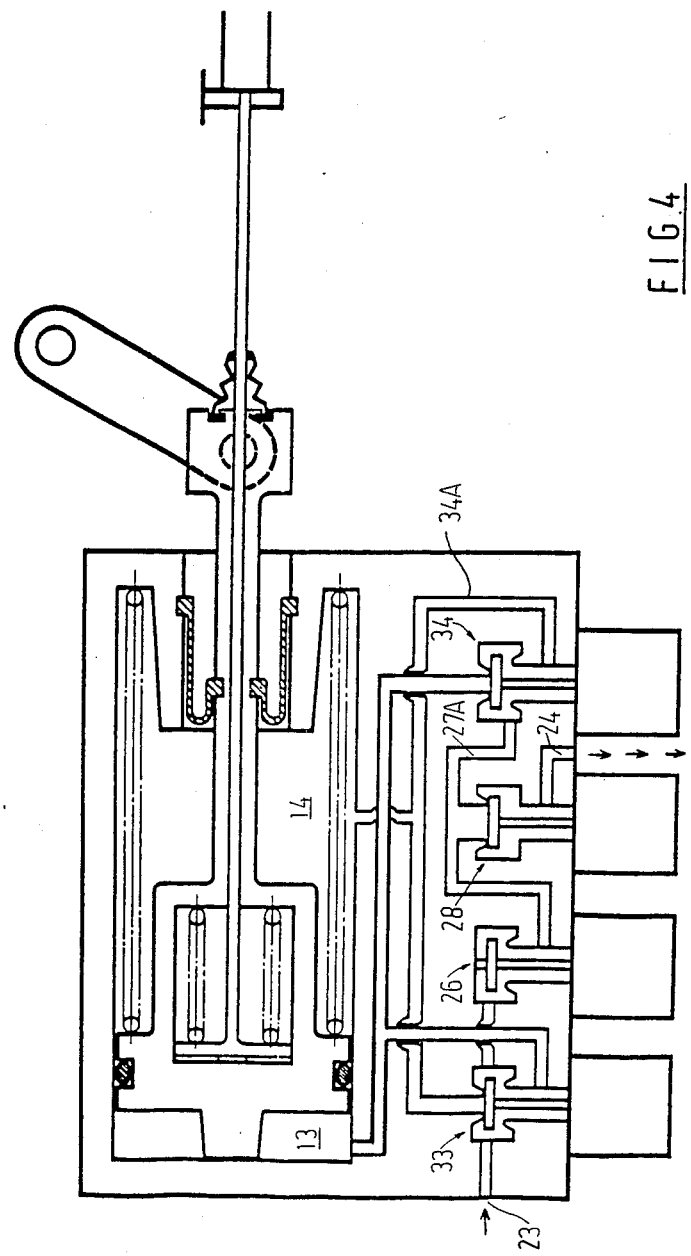

CONTROL DEVICE

This invention relates to a control device for controlling the operation of a fuel control member of a vehicle engine.

By the fuel control member is meant the control which is connected to the vehicle throttle pedal.

In some vehicles it is required to provide a torque control system which can override the setting of the aforesaid control by the driver of the vehicle in the event that the driven wheels of the vehicle will start to spin. The action of the system when spin is detected, will be to reduce the torque delivered by the vehicle engine.

One such system is disclosed in GB 2191542A, in which, at the onset of wheel slip, a sensor actuates an engine throttle value in the closing sense by a hydraulic or pneumatic device associated with the connection between an accelerator pedal and the throttle valve. The hydraulic or pneumatic device takes the form of a piston slidably disposed within a housing, and a rod connected to the throttle valve extends out of the housing. by appropriate application of pressure or vacuum to the sides of the piston, the throttle valve may thus be moved in the closing sense upon detection of wheel spin by the sensor.

The present applicants have devised a control device for controlling the operation of a fuel control member of a vehicle engine which not only produces torque control in the event of wheel spin, but which may also be used as a cruise control device, to maintain the vehicle at a constant speed.

In accordance with the present invention, a control device for controlling the operation of a fuel control member of a vehicle engine comprises a hollow housing, a fluid pressure operable member movable in the housing and dividing the interior of the housing into first and second chambers on opposite sides of the fluid operable member, biassing means for biassing the fluid pressure operable member in one direction, coupling means connected to said member and extending to the exterior of the housing, said coupling means in use coupling the fluid operable member to said fuel control member, a first inlet on the housing for connection in use to a vacuum or pressure source, a second inlet open to atmosphere, first and second operation control valves movable substantially simultaneously to respective first and second positions to connect said chambers alternatively to said first inlet, and first and second adjustment valves controlling communication between the inlets respectively and the other chamber, the arrangement being such that when the said first adjustment valve is open and the second adjustment valve closed, the pressure in the said chambers will be substantially equal to allow the fluid pressure operable member to be adjusted in the housing, and when said first valve is closed and said second valve is opened, the fluid pressure in said other chamber will differ from that in said one chamber to cause movement of the fluid pressure operable member, wherein when the first and second control valves are in a first one of the two positions, the operation of the said adjustment valves controls the pressure in one chamber to cause movement of the fluid pressure operable member in the direction to reduce the torque developed by the engine, and when the first and second control valves are in a second one of the two positions, the operation of the said adjustment valves controls the pressure in one chamber to cause movement of the fluid pressure operable member to maintain a constant vehicle speed, the actual pressure in the said chamber being controllable by operation of said adjustment valves.

An example of a control device in accordance with the invention will now be described with reference to the accompanying drawings, in which:

FIG. 4 is a further modification of the control device seen in FIG. 1.

Figure 1:
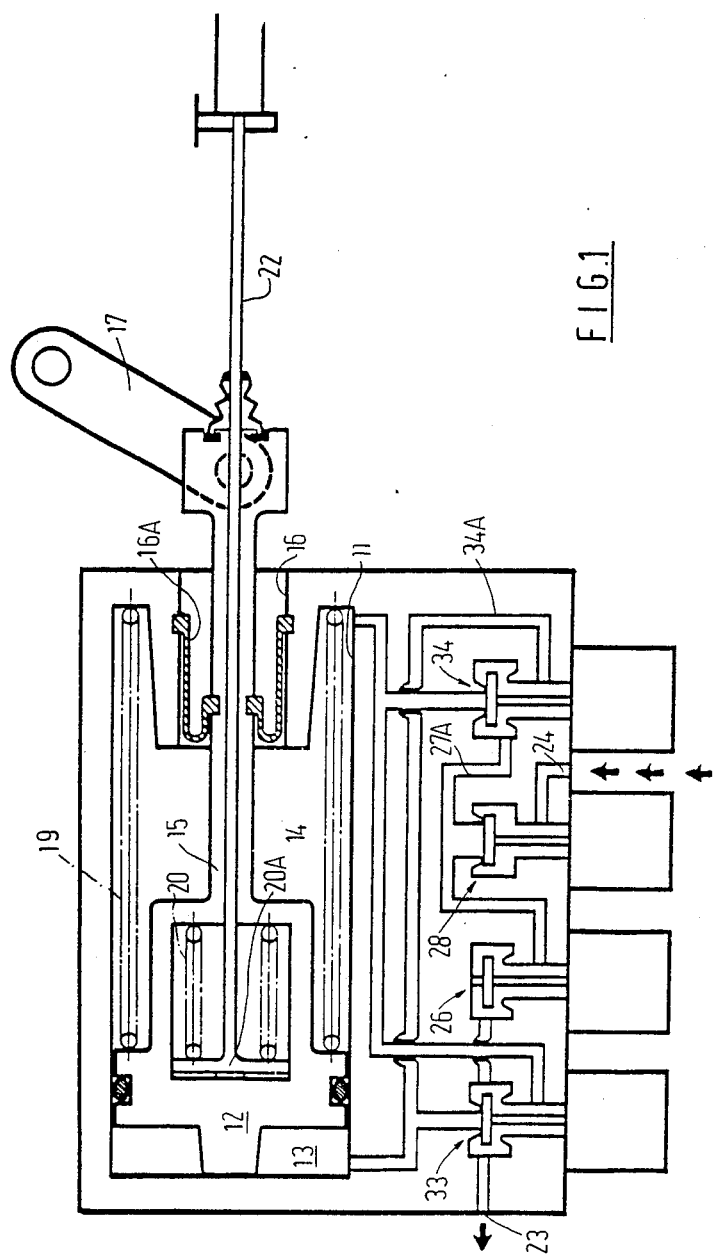
FIG. 1 is a diagrammatic view of a first embodiment of control device in accordance with the present invention.
Figure 2:
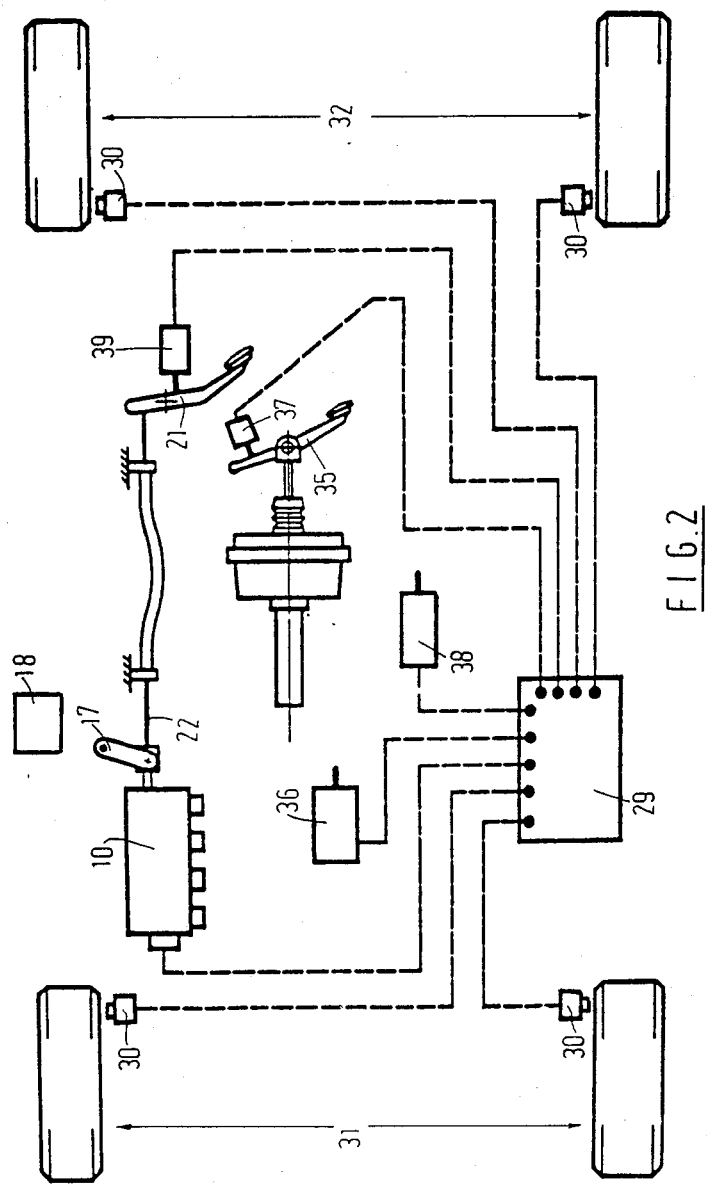
FIG. 2 is a diagrammatic layout of the vehicle system for torque and cruise control.

With reference to FIGS. 1 and 2, the control device comprises a hollow housing 10 which defines a cylinder 11 and in which is slidable a piston 12. The piston divides the cylinder into first and second chambers 13, 14 and the piston defines a tubular extension 15 extending to the exterior of the housing through an opening 16. A seal is established between the opening and the extension by a rolling diaphragm 16A.

Exterior of the housing the extension is pivotally connected to an arm 17 of the fuel control member 18, for example the butterfly valve of the carburettor of the vehicle engine. The piston 12 is biassed by a coiled compression spring 19 in a direction to reduce the volume of the chamber 13 and the piston is connected through a lost motion spring 20 with the throttle pedal 21 of the vehicle, the inner member 22 of the usual Bowden cable passing through a drilling in the extension and being connected to a spring abutment 20A slidable within the piston.

The housing 10 is provided with a first inlet 23 which in use in connected to the inlet manifold of the engine whilst a further second inlet 24 on the housing communicates with the atmosphere. The first inlet 23 is connected to a first operation control valve 33 comprising a solenoid changeover valve 33 which has two operable positions, one position (de-energised as shown) connecting the inlet 23 to the chamber 14 directly and the other position connecting the inlet 23 directly to the chamber 13. In the first, de-energised state of the changeover valve 33, the inlet 23 is also normally connected to the chamber 13 via a first adjustment valve 26 comprising a normally-opened solenoid valve, a passageway 27A, a second operation control valve 34 comprising a solenoid changeover valve 34 (which moves into its first and second operable positions simultaneously with the other first changeover valve 33) and a passageway 34A. In the second, energised state of the changeover valves 33, 34, the inlet 23 is also normally connected to the chamber 14 via the normally-opened solenoid valve 26, the passageway 27A and the second changeover valve 34.

The passage 27A can be connected to the inlet 24 through a second adjustment valve 28 comprising a normally closed solenoid valve. The energisation of the valves 26, 28, 33, 34, which are in series with each other is controlled by an electronic control system 29 which receives wheel speed signals from speed sensors 30 associated with the road wheels of the vehicle. It will be assumed that the wheels 31 are the driven wheels and the wheels 32 the non driven wheels.

In operation, with all the wheels rotating at substantially the same speed the valves will be deenergised so that through the first adjustment valve 26 the pressures in the two chambers will be equal and the piston substantially pressure balanced. Movement of the throttle pedal is therefore transmitted to the arm 17 through the inner member 22 of the Bowden cable, the lost motion spring 20A and the piston 12. The spring 19 forms the conventional throttle return spring.

If the torque developed by the vehicle engine is sufficient to cause one or both of the driven wheels 31 to spin, the control device is brought into operation to reduce the torque developed by the engine. Such spinning of the driven wheels can be caused by the wheels encountering a slippery surface or of course due to an excessive power demand by the driver. The fact that the driven wheels are spinning is determined by the control system by comparing the speed signals produced by the sensors 30 of the driven and non-driven wheels.

When wheel spin is detected the control system causes actuation of the two operation control or changeover valves 33, 34 to move them into the alternative positions from those shown in FIG. 1. Thus, first inlet 23 is connected directly to the chamber 13 and is also connected to the chamber 14 via the first normally-opened solenoid adjustment valve 26, the passageway 27A and the changeover valve 34. The second normally-closed solenoid adjustment valve 28 ensures that the atmospheric pressure cannot enter the system. The control system also causes closure of the adjustment valve 26 and opening of the adjustment valve 28. The effect of this is to unbalance the fluid pressures acting on the piston resulting in movement of the piston 12 from an intermediate position, towards the left thereby reducing the torque developed by the engine. In practice the valves 26, 28 will be pulsed, one or the other being momentarily actuated to control the pressure in the chamber 14 so that the torque developed by the engine is controlled to minimise wheel spin. When it is sensed that the speeds of the driven and non-driven wheels are substantially equal, the valves 26, 28 are deenergised so that full control is returned to the driver. The lost motion spring 20 is compressed during movement of the piston 12 towards the left if the throttle pedal is not released by the driver and a reaction force will be felt by the driver at the throttle pedal.

In operation with all valves de-energised as shown, the chambers 13 and 14 are both connected to the first inlet 23. The piston can therefore move freely in the cylinder and normal throttle control is obtained. In operation with all the valves 26, 28, 33, 34 de-energised as shown, chamber 14 is connected directly to the inlet 23, and the chamber 13 is connected to the inlet 23 via the first normally open adjustment valve 26, the passageway 27A, the changeover valve 34 and the passageway 34A.

The facility for cruise control is only required when the higher gear ratios of the vehicle gearbox are selected and when the brake pedal 35 of the vehicle is released. The control system 29 is therefore provided with signals from switches 36, 37 associated with the gearbox and brake pedal respectively. Moreover, selection of cruise control is effected by a driver operable switch 38. Assuming that the signals from the switches 36, 37 indicate that the cruise control facility can be rendered operative, operation of the switch 38 will cause the control system firstly to memorise the desired speed being that speed prevailing at the instant of operation of the switch 38 and secondly to energise adjustment valves 26 and 28, the operation control valves 33 and 34 remaining in their de-energised state. The effect of this is to allow the pressure in the chamber 13 to increase towards atmospheric pressure with the result that the fluid forces acting on the piston are no longer balanced. The differential pressure acting on the piston produces a force which opposes the action of the spring 19 and when the force developed due to the differential pressure balances the force exerted by the driver, the latter can remove his foot from the throttle pedal. In this condition, both the adjustment valves 26, 28 are normally kept closed. The control of the vehicle speed is now effected by the cruise control system and if for example the vehicle starts to slow down the control system will sense the reduced speed and open the valve 28 to increase the pressure in the chamber 13. This causes movement of the piston in the direction to increase the power output of the engine to restore the speed. If on the other hand the vehicle speed should increase the first adjustment valve 26 is opened to reduce the pressure in the chamber 13 thereby causing the piston to move towards the left to reduce the power developed by the engine.

If the driver requires an increased speed in order to overtake another vehicle, he can depress the throttle pedal to move the piston to the right to effect an increase in the power output of the engine. The control system during this period is rendered inoperative by a signal from a switch 39 responsive to the movement of the throttle pedal. When the increased speed is no longer required, the throttle pedal can be released by the driver and the control system will once again assume control of the vehicle speed. If the driver requires to slow the vehicle the brake pedal is depressed and a signal is provided by the switch 37 which de-activates the control system. In order to obtain cruise control following deactivation the switch 38 must be operated once the desired speed has been attained. The system is only temporarily de-activated if a lower gear ratio is selected.

As described above the system is in effect in series with the throttle pedal and the arm 17 since movement of the throttle pedal is transmitted through the piston. If desired however the inner member 22 of the Bowden cable can be connected directly to the arm 17 through a lost motion spring with the extension 15 being connected as illustrated directly to the arm.

Figure 3:
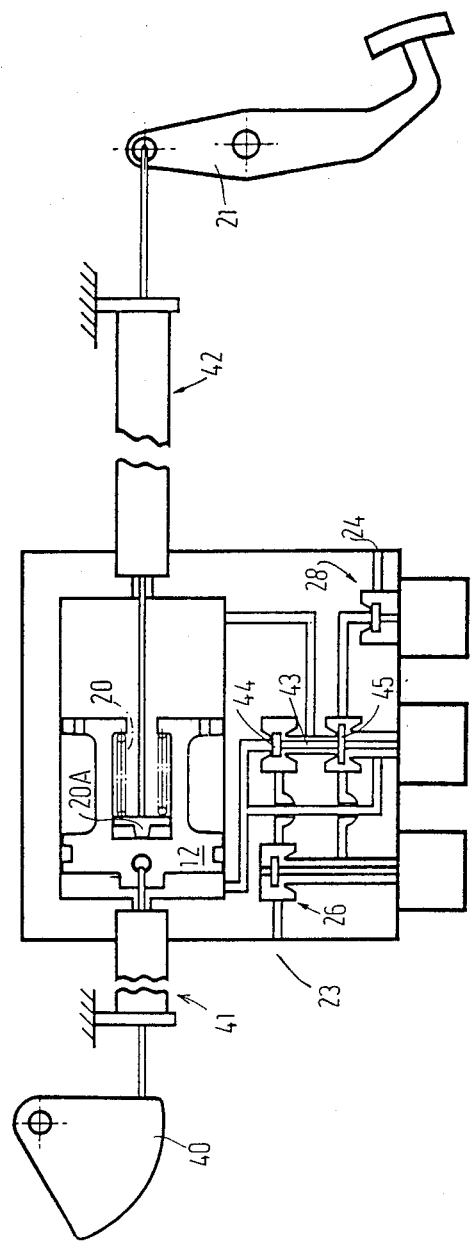
FIG. 3 is a modification of the control device seen in FIG. 1.

FIG. 3 of the drawing shows modifications to the control device of FIG. 1 which allows the device to be incorporated into the Bowden cable connection between the throttle pedal and the arm 40 of the fuel control member 18. As seen in FIG. 3, the arm 40 is connected by a length 41 of Bowden cable to the device and the throttle pedal 21 is connected by a further length 42 of Bowden cable to the device. The relative length of the lengths of Bowden cable depend upon the engine installation. The inner member of the length 41 is directly connected to the piston 12 and the inner member of the length 42 is connected to the piston 12 by way of the spring 20 and its abutment 20A. The outer members of the lengths of Bowden cable are secured in the housing 10 and the Bowden cables form an adequate seal against leakage of air into the chambers defined on the opposite sides of the piston. It will be noted that the spring 19 of FIG. 1 has been omitted. The duty of this spring is provided by the conventional return spring (not shown) which is associated with the fuel control member.

Moreover as will be seen in FIG. 3, the valve arrangement of the control device of FIG. 1 may also be modified. In the control device of FIG. 1 two separate operation control changeover valves 33 and 34 along with their electromagnetic operators, are provided and these are energised at the same time when engine torque control is required. In the example of FIG. 3 the first and second operation control valves 33 and 34 are combined and are controlled by a single operator. The combined valve has a valve stem 43 upon which are mounted in spaced relationship, a pair of valve members 44, 45. The valve members are movable in series in respective valve chambers each valve chamber defining a pair of spaced opposed seatings. The upper valve member 44 together with its valve chamber and seatings forms the equivalent of the valve 33 of FIG. 1 and the lower first operation control valve member 45 together with its valve chamber and seatings forms the equivalent of the second operation control valve 34. The valve operator is energised in the engine torque control mode and is de-energised as shown for the use of the control device in the cruise control mode.

In order to avoid tolerance problems it is arranged that one of the valve members, in this case valve member 45, is more flexible than the other and that the associated seatings are closer to each other so that valve member 45 will close onto its seating before valve member 44, but will then flex to allow valve member 44 to seat.

The system can be utilised with vehicles employing compression ignition engines in which the fuel pumping apparatus of the engine is associated with a "two speed" governor. With such an arrangement since the inlet manifold cannot be used as a source of vacuum, a separate vacuum pump could be provided which is driven by the engine. Alternatively, a compressor which is normally used to power the brakes of the vehicle, could be utilised in which case the first inlet 23 would be connected to the compressor and the connections of the valves to chambers 13, 14 reversed. This is shown in FIG. 4.

All the systems can be used in association with traction control systems which use the application of brake pressure to control rapid wheel spin.

I claim:

1. A control device for controlling the operation of a fuel control member of a vehicle engine, comprising a hollow housing, a fluid pressure operable member movable in the housing and dividing the interior of the housing into first and second chambers on opposite sides of the fluid pressure operable member, biassing means for biassing the fluid pressure operable member in one direction, coupling means connected to said fluid pressure operable member and extending to the exterior of the housing, said coupling means coupling the fluid pressure operable member to said fuel control member, a first inlet on the housing for connection to a vacuum or pressure source, a second inlet open to the atmosphere, first and second operation control valves movable substantially simultaneously to respective first and second positions to connect said chambers alternately to said first inlet, and first and second adjustment valves controlling communication between the inlets respectively and said chambers, the arrangement being such that when the said first adjustment valve is open and the second adjustment valve closed, the pressure in the said chambers will be substantially equal to allow the fluid pressure operable member to be adjusted in the housing, and when said first adjustment valve is closed and said second adjustment valve is opened, the fluid pressure in said second chamber will differ from that in said first chamber to cause movement of the fluid pressure operable member, wherein when the first and second control valves are in said first position the operation of the said adjustment valves controls the pressure in said first chamber to cause movement of the fluid pressure operable member in the direction to reduce the torque developed by the engine, and when the first and second control valves are in said second position, operation of said adjustment valves controlling the pressure in said first chamber to cause movement of the fluid pressure operable member to maintain a constant vehicle speed, the actual pressure in the said chamber being controllable by operation of said adjustment valves.

2. A control device as claimed in claim 1, wherein the operation control valves are in series with each other and are actuable independently.

3. A control device as claimed in claim 1, wherein the valve closure heads of the operation control valves are mounted on a common valve stem.

4. A control device as claimed in claim 1, wherein the operation control valves are connected in series with the adjustment valves.

5. A control device as claimed in claim 1, wherein the biassing means is situated within a chamber of the housing.

6. A control device as claimed in claim 1, wherein the biassing means is situated outside the housing.

7. A control device as claimed in claim 1, further comprising a lost motion connection between the coupling means and the fluid pressure operable member.

8. A control device as claimed in claim 1, wherein the valves comprise electromagnetically operated valves.

* * * * *